(No Model.)
L. B. SCHELL.
STRAWBERRY PLANTER.
No. 558,849. Patented Apr. 21, 1896.
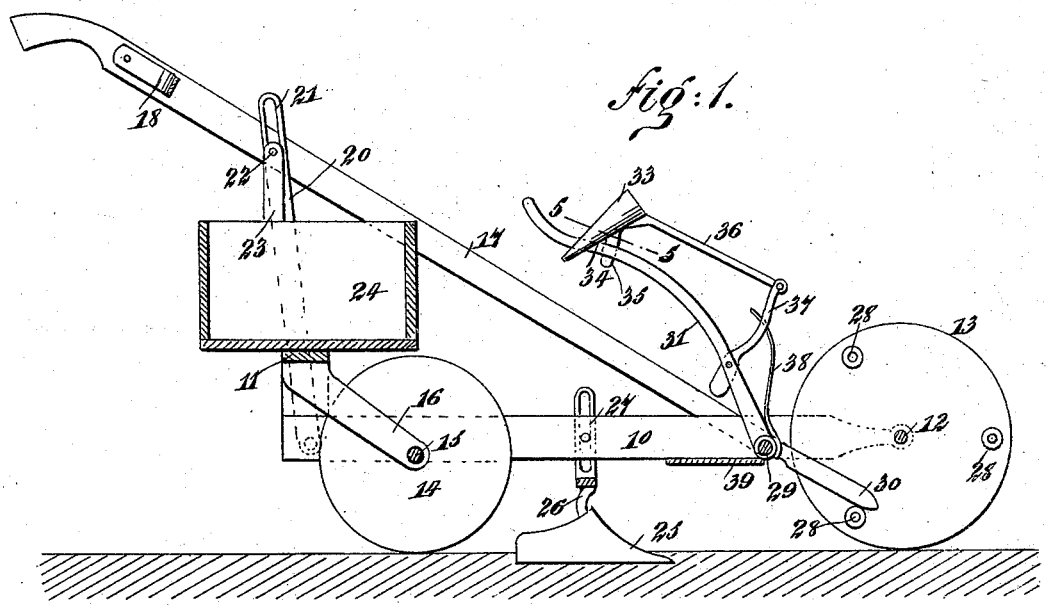
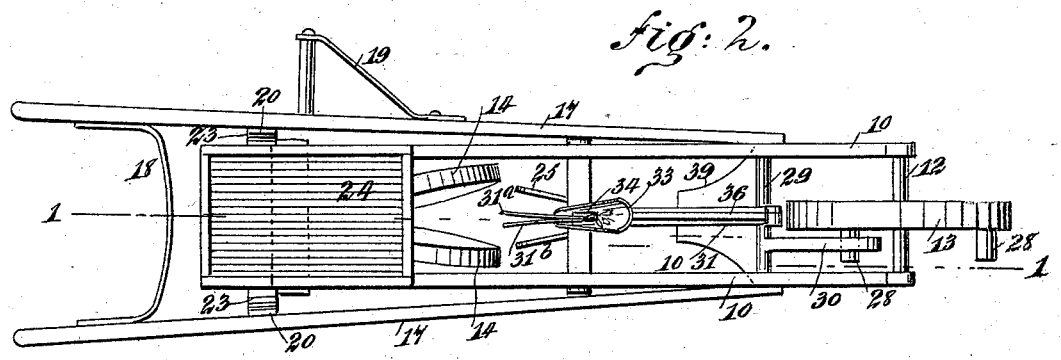
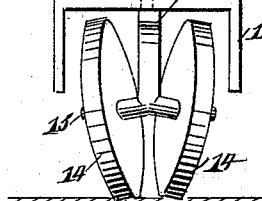
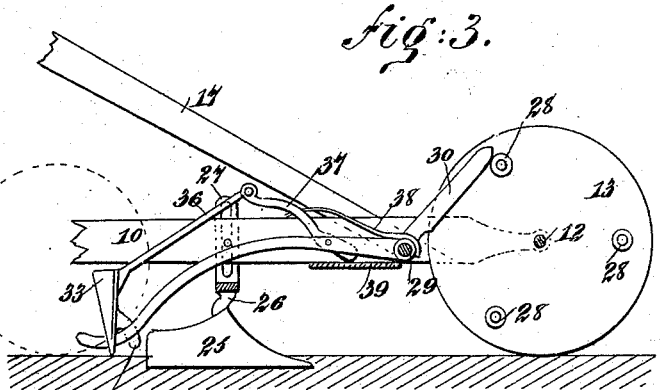
WITNESSES:
INVENTOR
L. B. Schell
BY
Munn & Co
ATTORNEYS.

UNITED STATES PATENT OFFICE.

LOUIS B. SCHELL, OF SAN ANTONIO, FLORIDA.

STRAWBERRY-PLANTER.

SPECIFICATION forming part of Letters Patent No. 558,849, dated April 21, 1896.

Application filed October 7, 1895. Serial No. 564,831. (No model.)

*To all whom it may concern:*

Be it known that I, LOUIS B. SCHELL, of San Antonio, in the county of Pasco and State of Florida, have invented a new and Improved Strawberry-Planter, of which the following is a full, clear, and exact description.

My invention relates to an improvement in planters, especially adapted for planting strawberry-plants, although it may be used for planting seedlings or slips of any description.

The object of the invention is to so construct the planter that it will economize in labor as well as in time, and which will, when the plant has been placed in the holder of the planter, automatically operate to deposit the plant in the furrow made to receive it, and furthermore automatically set the plant in the ground.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the planter, the said section being taken substantially on the line 1 1 of Fig. 2. Fig. 2 is a plan view of the said planter. Fig. 3 is a partial longitudinal sectional view illustrating the plant-carrier in position to place the plant in the furrow. Fig. 4 is a detail view of the rear or covering wheels of the planter, and Fig. 5 is a detail section taken substantially on the line 5 5 of Fig. 1.

In carrying out the invention the frame of the planter consists of two side beams 10, which are connected at the back by a substantially arch-shaped cross-bar 11 and at the front by a spindle 12. The forward traction-wheel 13, which is virtually the planting-wheel, is mounted to turn on the aforesaid spindle 12, while two covering-wheels 14 are adapted to support the rear portion of the frame. These covering-wheels are mounted upon the ends of an axle 15, which axle is inclined downwardly in opposite directions from its center, and the center of the axle is preferably connected with the central portion of the rear cross-bar 11 by an upwardly and rearwardly inclined shank 16, as shown in Figs. 1 and 4. Therefore the covering-wheels are at an angle to each other, converging at their bottom portions and diverging at the top, and handles 17 are secured to the frame and extend upwardly and rearwardly a proper distance, being usually connected by a cross-bar 18, and one of the handles, the left-hand one, preferably, is provided with a grip 19, whereby the person feeding the plants to the machine may take hold of the grip with the left hand and operate the plants with the right hand.

An upright 20 is secured to each side of each inner face of the frame, or to the ends of the frame cross-bar 11, and these uprights extend above the handles 17, being attached to their inner faces, and each upright has a slot 21 made in its upper end, the slots being adapted to receive pins 22, attached to standards 23, the said standards being secured to a receptacle 24, located over the rear cross-bar 11 of the frame. The plants to be set are placed in the aforesaid receptacle 24.

The plow 25, which is located between the planting and covering wheels, is placed longitudinally and centrally beneath the frame, nearer the covering-wheels than the planting-wheel and in alinement with the space between the former. The shank 26 of the plow is ordinarily attached to a substantially U-shaped body-bar 27, which body-bar is adjustably attached to the frame, being provided in each vertical member with a slot, and set-screws are passed through these slots into the said frame.

Strawberries are usually planted about twelve inches apart, and the planting-wheel 13 is of such diameter as to preferably be provided with three trip-pins 28 upon one of its faces, the trip-pins being at equal distances apart, and the distance between the trip-pins is such that the wheel will have traveled twelve inches along the ground before a lowermost pin is replaced by an adjoining pin.

A shaft 29 is mounted to turn in the frame, being located just back of the planting-wheel, and the said shaft is provided with a forwardly-extending trip-arm 30, adapted to be engaged by the trip-pins 28 of the planting-wheel as said wheel revolves. A plant-carrying arm 31 is secured to the shaft 29, preferably at its center and just at the rear of the planting-wheel 13. This arm is ordinarily upwardly and rearwardly arched from the shaft 29 for a predetermined distance, presenting a convexed upper surface; but its rear or free end is curved in an opposite direction, presenting a concaved upper surface, and this end of the arm is bifurcated, whereby two members 31$^a$ and 31$^b$ are obtained, the members being of a spring character, and said members are normally close together at their centers but diverge at their extreme rear ends. In fact the arm 31, as shown in Fig. 5, is preferably made of two pieces, except where it is connected with the shaft, and adjacent to the rear end of the arm 31 its members are spread apart so as to form an opening 32, wider than and adjacent to that portion of the concaved portion of the arm adapted to clamp the roots of a plant.

A guide-chute 33, open at its rear and preferably of tapering form, is used in connection with the receiving end or section of the plant-carrying arm, and the said chute is provided with an opening 34, (shown in Figs. 1 and 2,) through which the receiving-section of the arm 31 passes.

A foot 35 is attached to the rear portion of the chute 33, and is normally situated in the opening 32, produced in the plant receiving or carrying arm. The chute is attached to the rear end of a rod 36, which rod extends forwardly and is pivotally connected to a lever 37, the latter being preferably more or less curved above the plant-carrying arm, and the said lever is pivoted upon the aforesaid arm near its connection with the shaft, and may be bifurcated at its pivot-point.

A spring 38 engages with the upper portion of the lever 37, and this spring is attached at its lower end to any convenient support, usually being secured to the shaft 29. Immediately below and at the rear of the shaft 29 a plate 39 is secured to the frame in any approved manner, and this plate is adapted to engage with the heel of the lever 37 just prior to the plant-carrying arm bringing the plant in position to be dropped in the furrow.

The foot 35 is preferably made wedge shape, since it is adapted to spread apart the plant-receiving section of the plant-carrying arm in order that the plant may be dropped therefrom.

In the operation of the machine, the plant-carrying arm being in the position shown in Fig. 1—that is, in the upper position—the plants are placed between the members of the receiving-section of the arm just in front of the chute 33, as illustrated in Fig. 2, the roots being clamped by the aforesaid members. At this time the trip-arm 30 will be in engagement with the upper surface of the lowermost trip-pin 28. As the machine is advanced the aforesaid trip-arm will be carried upward by the said pin, and the plant-carrying arm will be carried downward and rearward beyond the rear portion of the plow 25 or over the furrow and adjacent to the covering-wheels, and as the arm 31 is then carried downward the heel of the lever 37 will strike the plate 39, as shown in Fig. 3, and at the time that the plant-receiving end of the plant-carrying arm has practically entered the opening between the sides of the plow at the rear, as shown in Fig. 3, the lever 37 will have been pushed rearward by reason of its engagement with said plate, and the foot 35 of the chute will also be carried rearward together with the chute, they being in connection with the lever, and the aforesaid foot will force the receiving members of the plant-carrying arm apart, permitting the plant to drop, which plant will be guided in its downward movement to the furrow by the chute 33. As the machine further advances the trip-arm will have been released from the upper trip-pin, and the spring 38 will restore the plant-carrying arm to its upper normal or receiving position, and the covering-wheels will pass almost immediately at each side of the plant just deposited and pack the earth neatly around it. This machine is exceedingly simple and durable in its construction, and by its means plants may be set out in many instances better than by hand, and at all times much more expeditiously. The members 31$^a$ and 31$^b$ at the rear of the plant-carrying arms are virtually jaws.

The distance between plants may be readily changed by, for example, changing the number of pins 28, since only two might be used placed diametrically opposite each other, making the distance between plants eighteen inches, or else one pin only need be employed, making the distance between plants about three feet, and if a less distance than twelve inches is required more pins than shown should be introduced.

It may be inferred that the plants have nothing to sustain them in the furrows when deposited there by the carrying-arm 31 until covered up by the rear wheels 14. The plants are in practice set between the two rear or covering wheels and cannot drop, as they are covered almost instantly upon being placed in the furrow. The planter, as hereinbefore stated, may be used for planting strawberry-plants or plants of other character.

Having thus described my invention, I claim as new and desire to secure by Letters Patent—

1. In a planter for planting strawberry and other plants, an arm capable of movement to and from the ground, being forced toward the ground by the forward movement of the planter and spring-controlled in its movement from the ground, jaws formed at the end of the arm, a guide for the plant, having movement upon the jaws, and a spreading device adapted for movement between the jaws and operating to spread the jaws on the downward movement of the arm, as and for the purpose set forth.

2. In a planter, the combination, with a planting-wheel having trip-pins, of a plant-carrying arm provided with a trip-arm adapted for engagement with the trip-pins, the free end of the plant-carrying arm being provided with jaws to receive the plant, a chute through which the receiving-section of the plant-carrying arm has movement, a lever adapted to give lateral movement to the chute, and a device for separating the jaws of the said plant-carrying arm, actuated from the said lever, as and for the purpose set forth.

3. In a planter for strawberry and other plants, a planting-wheel, a frame connected therewith, said planting-wheel being provided with trip-pins, a plant-carrying arm provided with spring-jaws to receive a plant and operated from the trip-pins, a lever fulcrumed upon the said arm, a chute connected with the said lever through which the plant-receiving end of the plant-carrying arm passes, a device for separating the jaws, operated from the said lever, a tension device adapted to normally hold the arm in an upper position, and a support for the heel of the lever when the arm is in a lower or planting position, substantially as described.

4. In a planter for strawberry and similar plants, the combination, with a frame, a planting-wheel having trip-pins, covering-wheels converging at their lower ends and diverging at their upper ends, and a furrow-opener located between the planting and covering wheels, of a planting device, consisting of an arm having spring-controlled jaws to receive the plant and fulcrumed within the frame and operated from the trip-pins of the planting-wheel, a chute having sliding movement on the jaws of the said arm, a lever connected with the said chute, an opening device operated from the lever and adapted to move between the jaws, and a tension device normally holding the arm in an upper position, as and for the purpose set forth.

5. A planting device for strawberry and like plants, the same consisting of an arm having spring-controlled jaws to receive a plant, the said arm being adapted to be pivoted within the frame and provided with an extension for engagement with the trip device, a chute having sliding movement over the jaws of the arm, a lever fulcrumed upon the arm and having its heel extending below the same for engagement with a fixed object, and a tension device operating to hold the arm in an upper or receiving position, a connection between the lever and chute, and a device for opening the jaws operated from the said lever, as and for the purpose specified.

LOUIS B. SCHELL.

Witnesses:
BERNARD JUSTEN,
LAMBERTUS HALSEMA.